US011915842B2

(12) United States Patent
Ma et al.

(10) Patent No.: US 11,915,842 B2
(45) Date of Patent: Feb. 27, 2024

(54) FLANGE, INSULATOR AND INSULATED SUPPORT POST

(71) Applicant: JIANGSU SHEMAR ELECTRIC CO., LTD., Nantong (CN)

(72) Inventors: Bin Ma, Nantong (CN); Chao Liu, Nantong (CN); Jiang Fang, Nantong (CN); Guiyan Ni, Nantong (CN); Shuchen Zhou, Nantong (CN); Xuejun Cai, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 537 days.

(21) Appl. No.: 17/055,084

(22) PCT Filed: Mar. 19, 2019

(86) PCT No.: PCT/CN2019/078755

§ 371 (c)(1),
(2) Date: Nov. 12, 2020

(87) PCT Pub. No.: WO2019/242350

PCT Pub. Date: Dec. 26, 2019

(65) Prior Publication Data

US 2021/0125755 A1 Apr. 29, 2021

(30) Foreign Application Priority Data

Jun. 20, 2018 (CN) ......................... 201820964869.1

(51) Int. Cl.
*H01B 17/14* (2006.01)
*H01B 17/36* (2006.01)
*H01B 17/38* (2006.01)

(52) U.S. Cl.
CPC ............. *H01B 17/14* (2013.01); *H01B 17/36* (2013.01); *H01B 17/38* (2013.01)

(58) Field of Classification Search
CPC ........ H01B 17/14; H01B 17/36; H01B 17/38; H01B 17/56; H01B 17/60; H01B 17/30
(Continued)

(56) References Cited

U.S. PATENT DOCUMENTS 4,401,841 A * 8/1983 Meyer .................... H01B 17/36 174/209
5,466,891 A * 11/1995 Freeman ................ H01B 17/28 174/140 R
(Continued)

FOREIGN PATENT DOCUMENTS

CN 103065744 A 4/2013
CN 103077785 A 5/2013
(Continued)

OTHER PUBLICATIONS

International Search Report for Application No. PCT/CN2019/078755 dated May 28, 2019, 2 pages.
(Continued)

*Primary Examiner* — Angel R Estrada
(74) *Attorney, Agent, or Firm* — Seyfarth Shaw LLP

(57) ABSTRACT

Provided is a flange (100) connected to an end of an insulating tube (10), the flange includes a flange plate (110) abutting the end of the insulating tube, a groove (111) recessed toward inside of the insulating tube is disposed on
(Continued)

the flange plate, the groove is connected to the insulating tube, an inflation valve (120) is disposed within the groove, the groove is filled with sealing material (130) which covers the inflation valve. Provided are also insulator and insulated support post using the flange. The flange, the insulator and insulated support post help to protect the inflation valve from external force and the groove is filled with the sealing material to ensure the sealing performance of the flange.

14 Claims, 6 Drawing Sheets

(58) Field of Classification Search
USPC ........ 174/139, 137 R, 138 R, 135, 142, 145, 174/149 R, 152 G, 167, 169
See application file for complete search history.

(56) References Cited

U.S. PATENT DOCUMENTS

| | | | | |
|---|---|---|---|---|
| 7,495,172 | B2 * | 2/2009 | Amerpohl | H02G 15/064 174/176 |
| 8,324,504 | B2 * | 12/2012 | Grenier | C08L 23/0892 174/196 |
| 10,468,162 | B2 * | 11/2019 | Ma | H01B 17/66 |
| 11,114,220 | B2 * | 9/2021 | Jaenicke | H01B 17/42 |
| 11,276,514 | B2 * | 3/2022 | Pusthay | H01B 17/66 |
| 11,430,586 | B2 * | 8/2022 | Ma | H01B 17/145 |

FOREIGN PATENT DOCUMENTS

| | | | |
|---|---|---|---|
| CN | 103077787 | A | 5/2013 |
| CN | 205542336 | U | 8/2016 |
| CN | 104681373 | B | 10/2016 |
| CN | 106992047 | A | 7/2017 |
| CN | 207021046 | U | 2/2018 |
| CN | 208570227 | U | 3/2019 |
| FR | 2631152 | A1 | 11/1989 |
| RU | 2500652 | C1 | 12/2013 |
| RU | 150983 | U1 | 3/2015 |

OTHER PUBLICATIONS

Office Action in corresponding Russian Application No. 100,181 dated Aug. 18, 2021, 6 pages.
European Search Report for corresponding Application No. 19822168.1 dated Feb. 14, 2022, 8 pages.
Hearing Notice for corresponding Application No. 202017051369 dated Jun. 12, 2023, 3 pages.

* cited by examiner

FLANGE, INSULATOR AND INSULATED SUPPORT POST

CROSS REFERENCE TO RELATED APPLICATIONS

This is a U.S. National Stage application of, and claims priority to, PCT/CN2019/078755, filed Mar. 19, 2019, which further claims priority to Chinese Patent Application No. 201820964869.1, filed Jun. 20, 2018, the disclosures of which are incorporated herein by reference in their entirety.

TECHNICAL FIELD

The present disclosure relates to the field of insulating equipment for power transmission and transformation, and more particularly, to a flange, an insulator, and an insulated support post.

BACKGROUND

With the development and application of composite insulators, post insulators used in a power equipment are mostly composite insulators with large diameter. The composite post insulator includes a hollow composite insulating tube and an insulating material filled in the insulating tube, so as to meet electrical and mechanical properties of the power equipment. In prior art, insulating material filling generally includes solid filling and gas filling. The gas filling generally refers to that dried pure nitrogen is filled in the hollow insulating tube.

In order to facilitate the filling of the hollow insulating tube with gas, threaded holes are usually provided on flanges at both ends of the hollow insulating tube, and an inflation valve is threadedly connected to the threaded hole. The inflation valve connected to the flange will protrude outside the outer end surface of the flange, which is easily damaged by external forces during transportation and operation.

SUMMARY

To address the shortcomings in prior art, one of objects of the present disclosure is to provide a flange. A flange plate of the flange is provided with a groove for placing an inflation valve, which helps to protect the inflation valve from be damaged by external forces. In addition, the groove is filled with a sealing material to ensure sealing performance of an area where the inflation valve is located.

For achieving the above object, the present disclosure adopts technical solutions as follows. A flange is connected to an end of an insulating tube. The flange includes a flange plate abutting against the end of the insulating tube. The flange plate is provided with a groove recessed toward an inside of the insulating tube. The groove is in communication with the insulating tube. An inflation valve is provided in the groove. A sealing material is filled in the groove and covering the inflation valve.

The flange plate of the flange is provided with the groove recessed toward the inside of the insulating tube. The groove is provided with the inflation valve therein, to prevent the inflation valve from protruding outside the flange and protect the inflation valve from collision. The groove is filled with the sealing material, which covers the inflation valve and helps to ensure the sealing performance of the flange.

Wherein, a filling surface of the sealing material is coplanar with an outer end surface of the flange plate.

The filling surface of the sealing material is coplanar with the outer end surface of the flange plate, such that rainwater does not easily accumulate in the groove, and the water and vapor is prevented from infiltrating into the insulating tube.

Wherein, a first boss is provided on an end surface of the flange plate adjacent to the insulating tube, and the groove is provided in the first boss. Furthermore, the groove is coaxially provided with the first boss.

The first boss is provided on the flange plate, and the groove is provided in the first boss, such that while the inflation valve is stably connected to the flange plate, the thickness of the flange plate is reduced, supplies are saved, and costs are reduced.

Wherein, the groove is a stepped hole, the inflation valve is connected to the stepped hole, the inflation valve includes a fastening nut abutting against a step surface.

The groove has a stepped hole shape, which facilitates the connection between the inflation valve and the groove. A seal ring is provided in the fastening nut, so as to abut the fastening nut to the step surface, ensuring the sealing performance of the connection.

Wherein, the step hole includes a first step surface adjacent to an outer end surface of the flange plate and a second step surface away from the outer end surface of the flange plate. The inflation valve abuts against the second step surface.

The step hole is provided with two step surfaces, which facilitates the fixed connection between the inflation valve and the step hole.

Wherein, the step surface is provided with a second boss. The fastening nut abuts against a boss surface of the second boss.

The fastening nut abuts against the boss surface of the second boss. Even if there is rainwater infiltration, the water will run off along the second boss and does not easily accumulate on the second boss, thereby preventing the water and vapor from infiltrating into the insulating tube via the connection interface between the inflation valve and the groove.

Wherein, the sealing material is rubber.

Another object of the present disclosure is to provide an insulator. The insulator includes the flange as described above. The insulator provided with the aforementioned flange facilitates the filling and detection of insulating gas, and also makes the inflation valve of the insulator less vulnerable to be damaged, the service life thereof is thus increased.

For achieving the above object, the present disclosure adopts the following technical solution, that is, an insulator includes the flange as described above.

Yet another object of the present disclosure is to provide an insulated support post.

For achieving the above object, the present disclosure adopts the following technical solution, that is, an insulated support post includes two insulators as described above, the two insulators being connected end to end. The flange at the end of the aforementioned insulator includes no inflation valve protruding toward the outer end surface of the flange, which facilitates the connection between the flanges at the end of the insulators.

DETAILED DESCRIPTION OF THE EMBODIMENTS

As required, embodiments of the present disclosure are disclosed here. However, it should be understood that the embodiments disclosed herein are merely typical examples of the present disclosure, which can be embodied in various forms. Therefore, the specific details disclosed here are not considered to be a limitation, but merely serve as a basis for claims and as a representative basis for teaching those skilled in the art to apply the present disclosure in any appropriate manner in practice, including the adopting various features disclosed herein and combining features that may not be clearly disclosed herein.

First Flange Embodiment of the Present Disclosure

Figure 1:
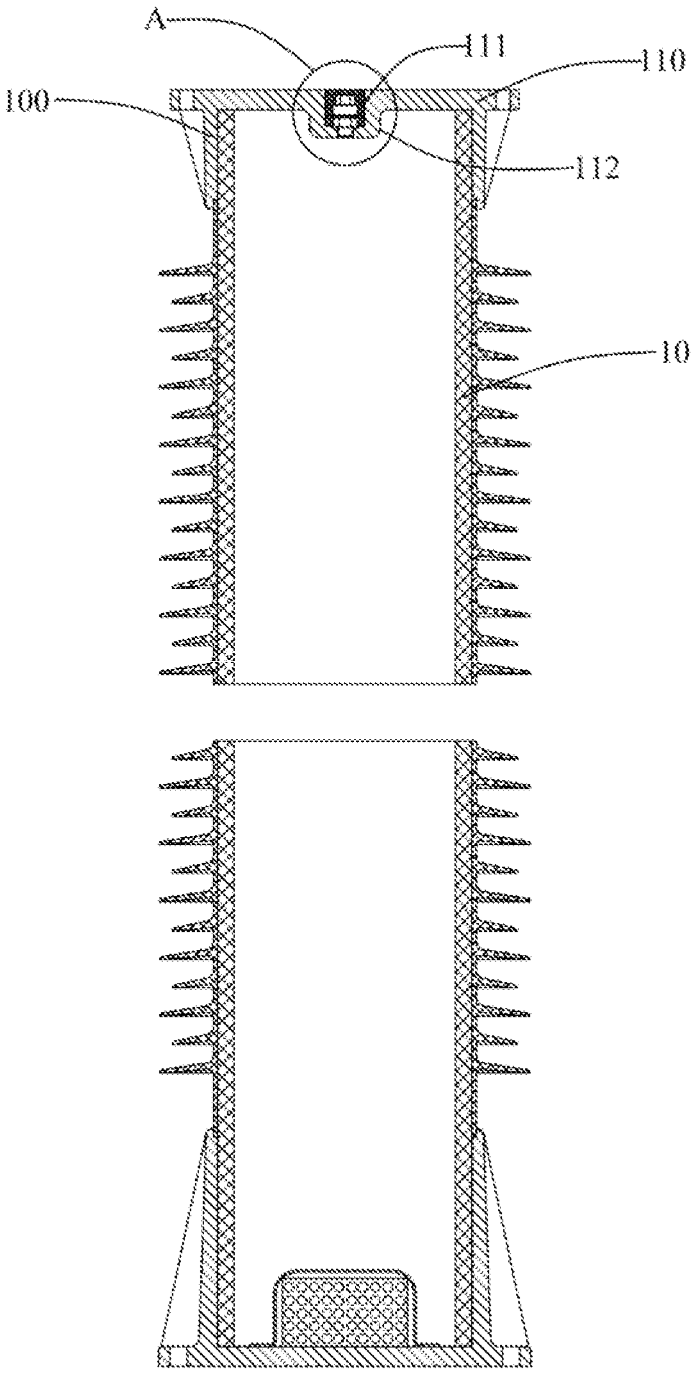
FIG. 1 is a longitudinal sectional structural schematic view showing a flange 100 mounted on an insulator according to a first embodiment of present disclosure.
Figure 2:
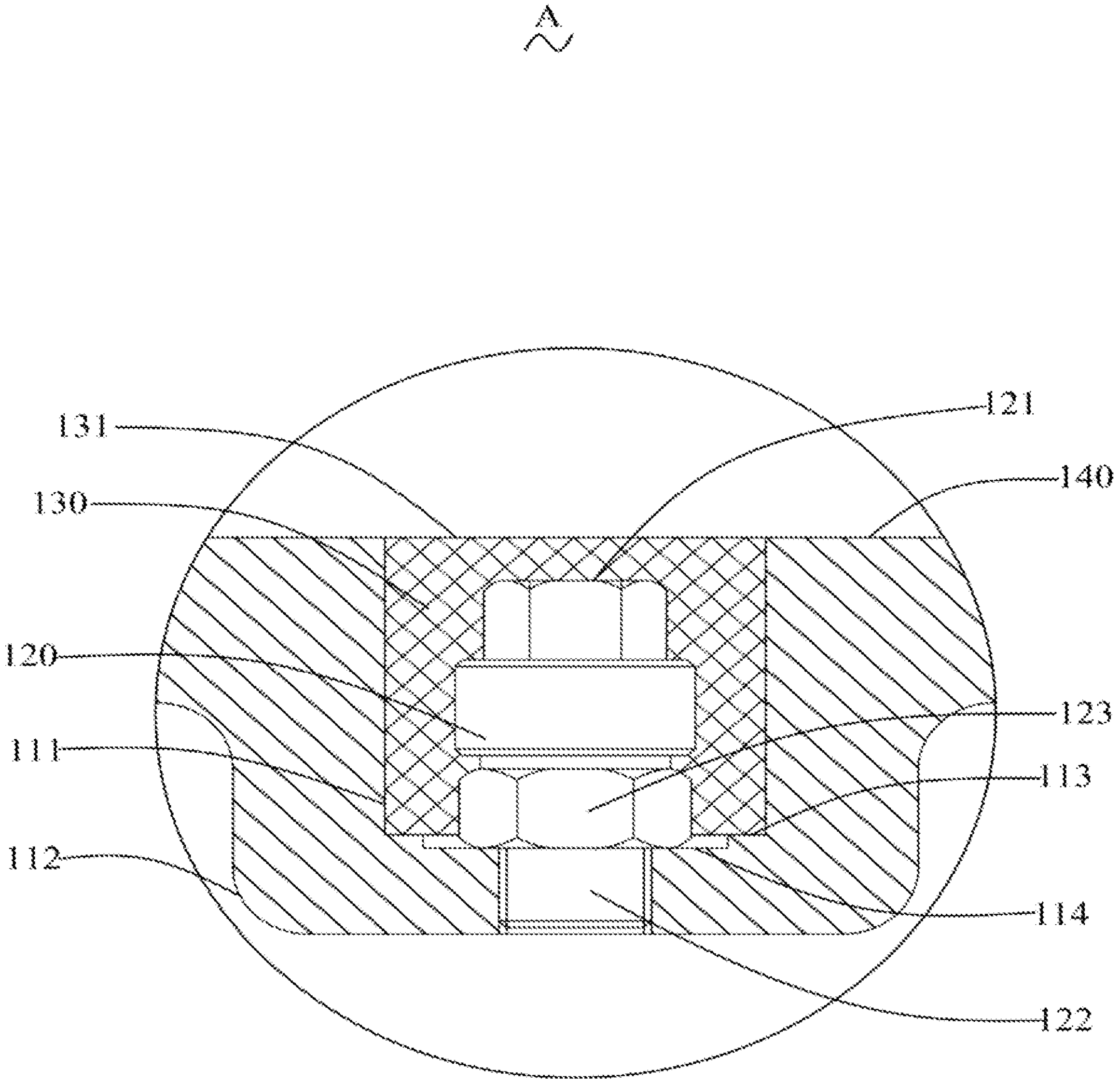
FIG. 2 is an enlarged structural schematic view of a portion A in FIG. 1.

As shown in FIGS. 1 and 2, an insulator of this embodiment includes an insulating tube 10 and a flange 100 connected to an upper end of the insulating tube 10 in a vertical direction. The flange 100 includes a flange plate 110 abutting against an end of the insulating tube 10. The flange plate 110 is provided with a groove 111 recessed toward an inside of the insulating tube. The groove 111 is in communication with the insulating tube 10. An inflation valve 120 is provided in the groove 111. A sealing material 130 is filled in the groove, and the sealing material 130 covers the inflation valve 120.

The flange plate 110 of the flange 100 is provided with the groove 111 recessed toward the inside of the insulating tube 10. The groove 111 is provided with the inflation valve 120 therein, which can prevent the inflation valve 120 from protruding outside the flange 100 and protect the inflation valve 120 from collision. The groove 111 is filled with the sealing material 130, which covers the inflation valve 120 and helps to ensure the sealing performance of the flange 100.

A filling surface 131 of the sealing material 130 is coplanar with an outer end surface 140 of the flange plate 110.

In this embodiment, the flange 100 is provided at the upper end of the insulator in the vertical direction. An end surface of the flange plate 110 away from the insulating tube 10 is the outer end surface 140. An end of the inflation valve 120 adjacent to the outer end surface 140 is an inflation inlet 121 for filling the insulating tube 10 with gas. The inflation valve 120 is provided inside the groove 111, that is, the inflation inlet 121 is lower than the outer end surface 140 in the vertical direction.

A gap between the groove 111 and the inflation valve 120 is filled with the sealing material 130. The sealing material 130 completely covers the inflation valve 120 in the groove 111, such that there is no gap in the groove 111. The filling surface 131 of the sealing material 130 is coplanar with the outer end surface 140 of the flange plate 110.

When the flange 100 with the inflation valve 120 is provided at the upper end of the insulator, the filling surface 131 of the sealing material 130 is coplanar with the outer end surface 140 of the flange plate 110, such that the outer end surface 140 of the flange plate 110 is flat and has no recess, which prevents rainwater from accumulating on and infiltrating into the outer end surface 140, thus improving the sealing performance of the flange 100.

It should be noted that, in other embodiments, the flange with the inflation valve can also be provided at a lower end of the insulator. In that case, the filling surface of the sealing material can be or not be coplanar with the outer end surface of the flange plate.

The sealing material is rubber.

In this embodiment, the sealing material 130 is room-temperature vulcanizing silicone rubber. The room-temperature vulcanizing silicone rubber has good heat resistance, cold resistance and dielectric properties, which is suitable to be filled in the groove 111 as the sealing material to ensure the sealing performance of the flange 100.

It should be noted that, in other embodiments, other types of sealing materials, such as polyurethane, or other types of silicone rubber or rubber material, such as liquid vulcanized silicone rubber may also be adopted as the sealing material, and the redundant description thereof will not be made herein.

A first boss 112 is provided on an end surface of the flange plate 110 adjacent to the insulating tube 10, and the groove 111 is provided in the first boss 112.

In this embodiment, the groove 111 is provided in the first boss 112, and the groove 111 is coaxially provided with the first boss 112. The groove 111 is in communication with the insulating tube 10 through the first boss 112, and the inflation valve 120 is connected to the first boss 112.

The first boss 112 is provided on the flange plate 110, and the groove 111 is provided in the first boss 112 and coaxially provided with the first boss 112, such that while the inflation valve 120 is stably connected to the flange plate 110, the thickness of the flange plate 110 is reduced, supplies are saved, and costs are reduced.

It should be noted that, in other embodiments, the first boss may not be coaxially provided with the groove, as long as it is ensured that the groove is in communication with the inside of the insulating tube through the first boss. Alternatively, the flange plate may also be set to have enough thickness, so as to directly place the inflation valve without providing the first boss, and the redundant description thereof will not be made herein.

The groove 111 is a stepped hole. The inflation valve 120 is connected to the stepped hole 111. The inflation valve 120 includes a fastening nut 123 abutting against a stepped surface.

The groove 111 is the stepped hole 111, and the fastening nut 123 abuts against the stepped surface in a sealing way to ensure the reliability and the sealing performance of the connection of the inflation valve 120.

In this embodiment, the step hole 111 includes a first step surface 113 adjacent to the outer end surface 140 of the flange plate 110 and a second step surface 114 away from the outer end surface 140 of the flange plate 110. The inflation valve 120 abuts against the second step surface 114.

Specifically, the step hole 111 is provided at a center of the first boss 112 and is coaxially provided with the first boss 112. The end of the inflation valve 120 away from the outer end surface 140 is a connecting end 122. The connecting end 122 is connected to the groove 111, that is, the connecting end 122 is connected to the step hole 111. The fastening nut 123 abuts against the second step surface 114. A sealing ring (not shown) is provided in a surface where the fastening nut 123 abuts against the second step surface 114.

The inflation valve 120 is threadedly connected with the groove 111.

In this embodiment, the groove 111 is the stepped hole 111. The connecting end 122 and the step hole 111 are provided with mutually engaged threads, and the connecting end 122 and the groove 111 are fastened by threaded connection.

It should be noted that, in other embodiments, the inflation valve and the groove may also be connected by adhesive, crimping or the like, which is not limited to threaded connection, and the redundant description thereof will not be made herein.

Second Flange Embodiment of the Present Disclosure

Figure 3:
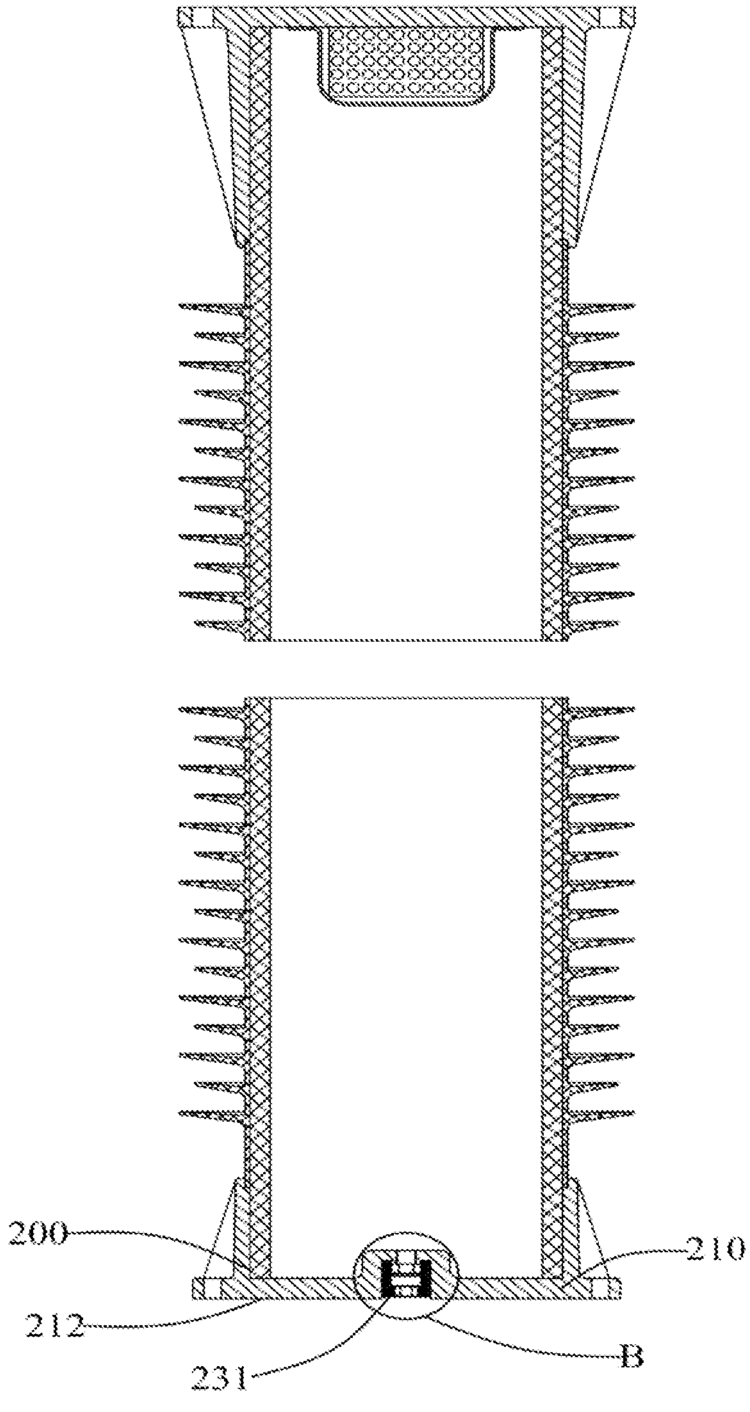
FIG. 3 is a longitudinal sectional structural schematic view showing a flange 200 mounted on an insulator according to a second embodiment of present disclosure.
Figure 4:
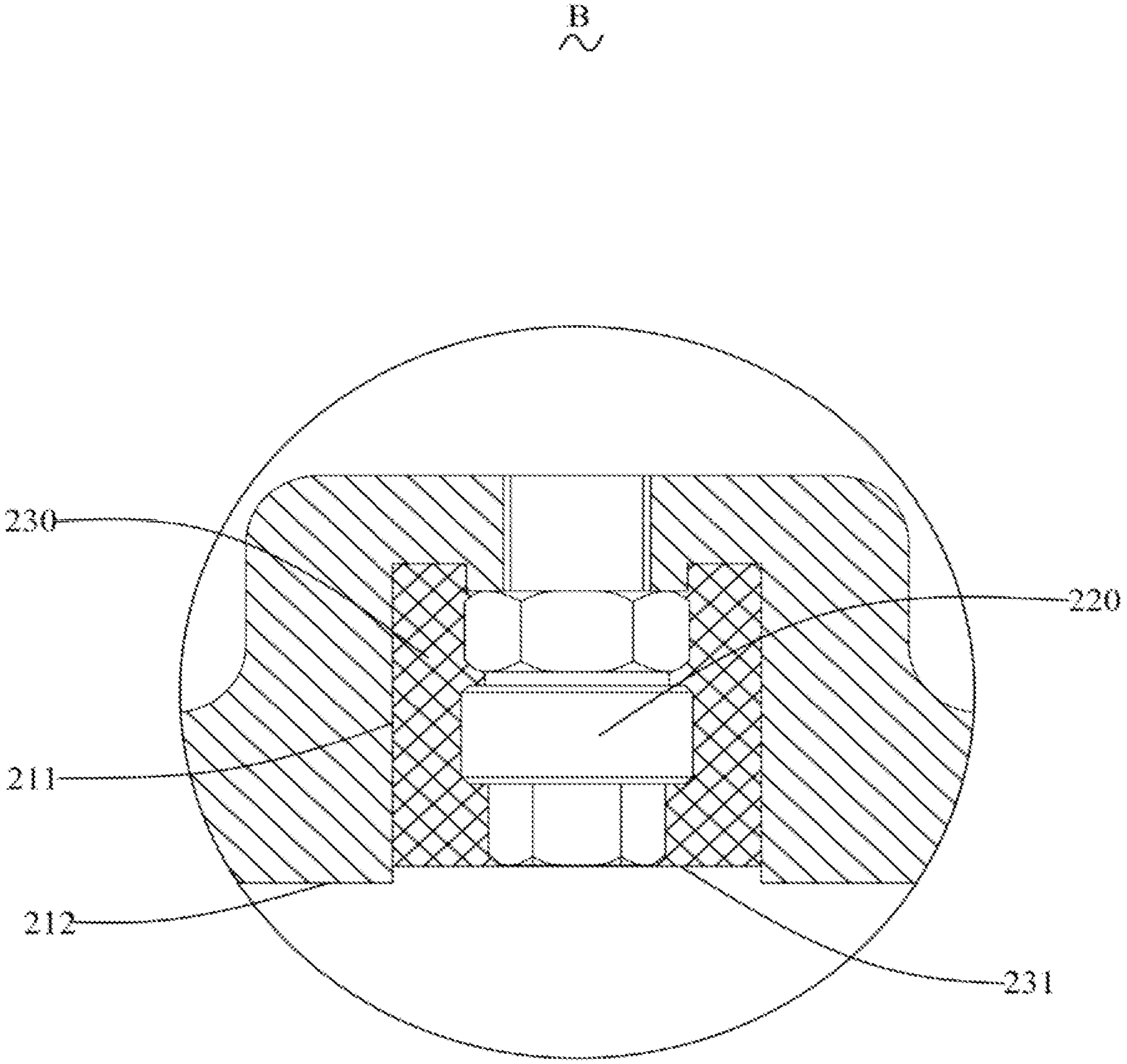
FIG. 4 is an enlarged structural schematic view of B in FIG. 3.

As shown in FIGS. 3 and 4, a flange 200 of this embodiment has a similar structure to that of the flange 100 in the first flange embodiment. The same structure of the flange 200 and flange 100 will not be repeated herein. The flange 200 differs from the flange 100 in that, in this embodiment, the flange 200 is provided at a lower end of the insulator in the vertical direction, and a filling surface 231 of a sealing material 230 is not coplanar with an outer end surface 212 of a flange plate 210 of the flange 200.

When the flange 200 is provided at the lower end of the insulator, rainwater cannot accumulate in a groove 211 due to the gravity, and thus the filling surface 231 may not be coplanar with the outer end surface 212 of the flange plate 210, thereby saving material and reducing cost.

In this embodiment, the sealing material 230 is filled in the groove 211, and the sealing material 230 completely covers an inflation valve 220. The filling surface 231 is lower than the outer end surface 212 of the flange plate 210.

It should be noted that, in other embodiments, both ends of the insulator can be provided with flanges that are provided with inflation valves. The filling surface of the flange at different ends can be set to have different heights according to the position of the flange.

Third Flange Embodiment of the Present Disclosure

Figure 5:
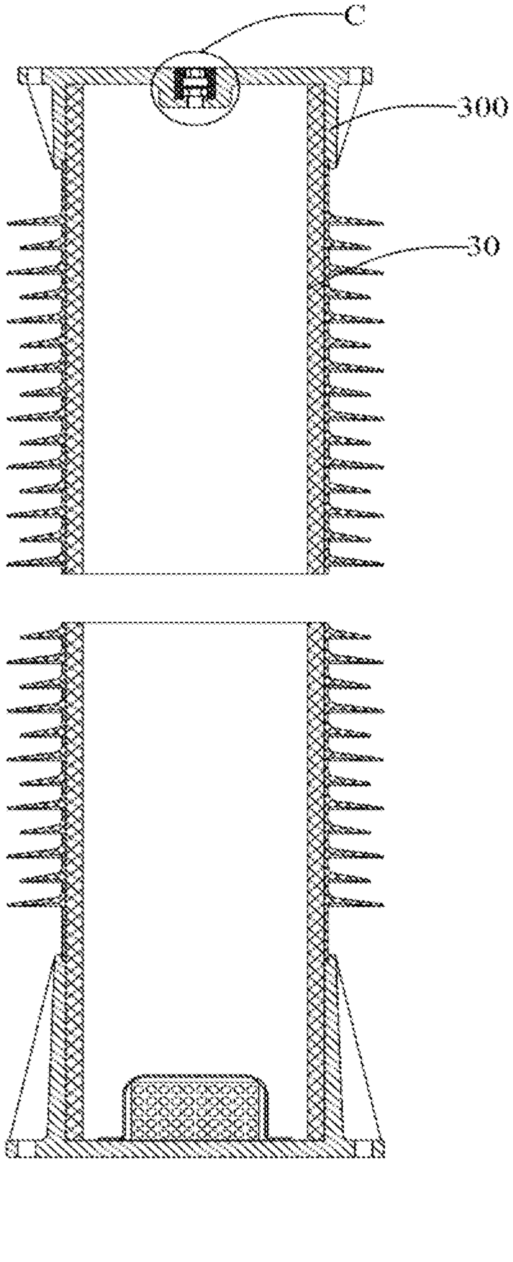
FIG. 5 is a longitudinal sectional structural schematic view showing a flange 300 mounted on an insulator according to a third embodiment of present disclosure.
Figure 6:
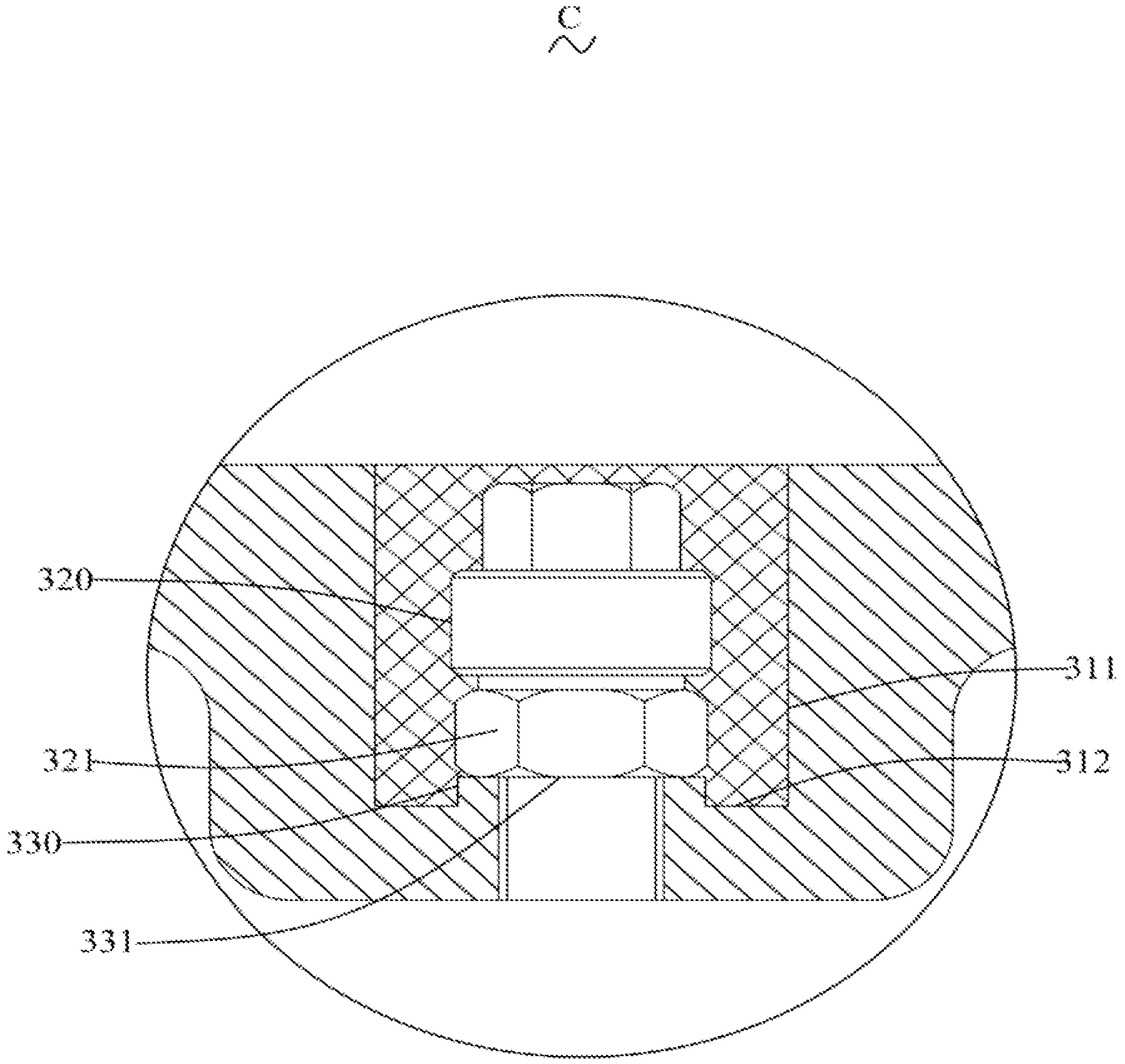
FIG. 6 is an enlarged structural schematic view of C in FIG. 5.

As shown in FIGS. 5 and 6, a flange 300 of this embodiment has a similar structure to that of the flange 100 in the first flange embodiment. The same structure of the flange 300 and flange 100 will not be repeated herein. The flange 300 differs from the flange 100 in that, a stepped surface 312 of a stepped hole 311 in this embodiment is provided with a second boss 330, and a fastening nut 321 abuts against a boss surface 331.

The second boss 330 is provided on the stepped surface 312, and the fastening nut 321 abuts against the boss surface 331. Even if there is rainwater infiltration, the rainwater cannot accumulate on the second boss 330 and will run off naturally. The presence of the second boss 330 can effectively prevent rainwater from entering an interface where the fastening nut 321 abuts against the boss surface 331, thereby ensuring that no water enters an insulating tube 30, which improves the sealing reliability of the flange 300.

In this embodiment, the groove 311 is the stepped hole 311. The second boss 330 is provided on the stepped surface 312 of the stepped hole 311. The second boss 330 is coaxially provided with the step hole 311. The second boss 330 is in communication with the step hole 311. The fastening nut 321 of an inflation valve 320 abuts against the boss surface 331. A sealing ring (not shown) is provided in a surface where the fastening nut 321 abuts against the boss surface 331.

First Embodiment of Insulator of the Present Disclosure

An insulator of this embodiment includes the flange described in any one of the aforementioned flange embodiments.

The insulator provided with the aforementioned flange facilitates the filling and detection of insulating gas, and also makes the inflation valve of the insulator less vulnerable to be damaged, the service life thereof is thus increased.

Specifically, in this embodiment, both ends of the insulator are provided with the flange described in the first flange embodiment.

It should be noted that, in other embodiments, both ends of the insulator may be provided with the flange described in any one of the aforementioned flange embodiments, alternatively, only one end of the insulator may be provided with the flange described in any one of the aforementioned flange embodiments.

First Embodiment of Insulated Support Post of the Present Disclosure

An insulated support post of this embodiment includes two insulators connected end to end, and the insulator is the insulator described in the first insulator embodiment.

The flange at the end of the aforementioned insulator includes no inflation valve protruding toward the outer end surface of the flange, which facilitates the connection between the flanges at the end of the insulators.

The technical solutions and technical features of the present disclosure have been disclosed as above, but it should be understood that under the creative idea of the present disclosure, various changes and modifications to the aforementioned structures and materials can be made by those skilled in the art, which includes a combination of technical features disclosed or claimed separately, obviously further includes other combinations of these features. These modifications and/or combinations all fall within the technical field involved in the present disclosure and fall into the protection scope of the claims of the present disclosure.

What is claimed is:

1. A flange connected to an end of an insulating tube, comprising:
   - a flange plate abutting against the end of the insulating tube, the flange plate including a groove recessed toward an inside of the insulating tube and in communication with the insulating tube, wherein the groove is a stepped hole and a boss is provided in the stepped hole;
   - an inflation valve disposed in the groove, and including a fastening nut abutting against a boss surface of the boss; and
   - a sealing material disposed the groove and covering the inflation valve.

2. The flange according to claim 1, wherein a filling surface of the sealing material is coplanar with an outer end surface of the flange plate.

3. The flange according to claim 1, wherein a second boss is provided on an end surface of the flange plate adjacent to the insulating tube, and the groove is provided in the second boss.

4. The flange according to claim 3, wherein the groove is coaxial with the second boss.

5. The flange according to claim 1, wherein the sealing material is rubber.

6. An insulator comprising the flange according to claim 1.

7. An insulated support post comprising two insulators according to claim 6 connected end to end.

8. A flange connected to an end of an insulating tube, comprising:

a flange plate abutting against the end of the insulating tube, the flange plate including a groove recessed toward an inside of the insulating tube and in communication with the insulating tube, wherein the groove is a stepped hole including a first step surface adjacent to an outer end surface of the flange plate and a second step surface away from the outer end surface of the flange plate;

an inflation valve disposed in the groove, and including a fastening nut abutting the second step surface; and a sealing material disposed the groove and covering the inflation valve.

9. The flange according to claim 8, wherein a filling surface of the sealing material is coplanar with an outer end surface of the flange plate.

10. The flange according to claim 8, wherein a boss is provided on an end surface of the flange plate adjacent to the insulating tube, and the groove is provided in the boss.

11. The flange according to claim 10, wherein the groove is coaxial with the boss.

12. The flange according to claim 8, wherein the sealing material is rubber.

13. An insulator comprising the flange according to claim 8.

14. An insulated support post comprising two insulators according to claim 13 connected end to end.

* * * * *